Nov. 15, 1932.　　　J. A. PERUSICK　　　1,887,698
DRILL
Filed May 26, 1932
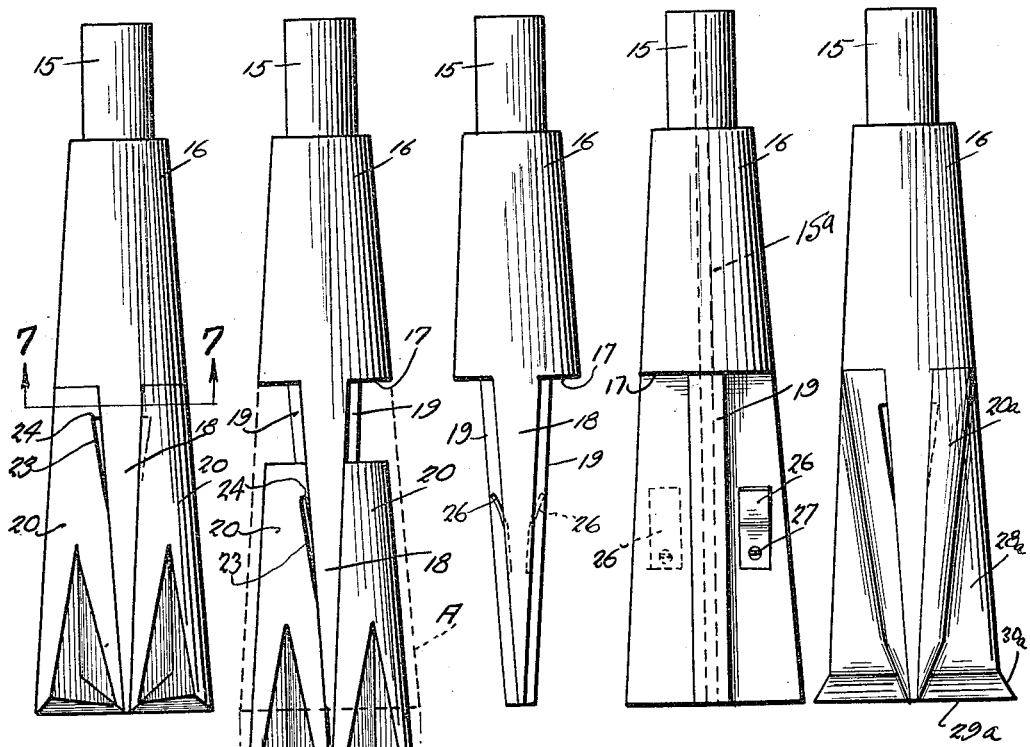
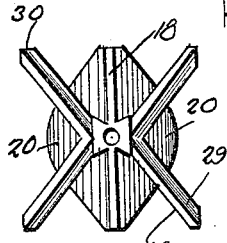
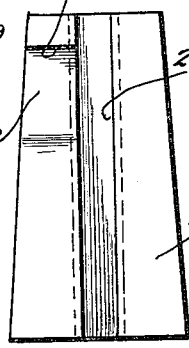
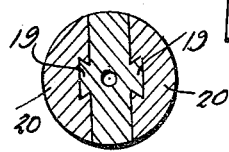
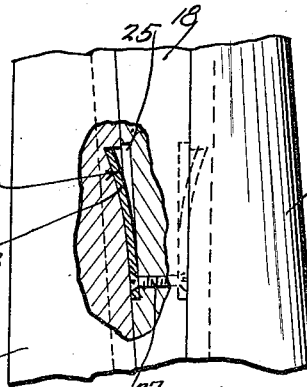
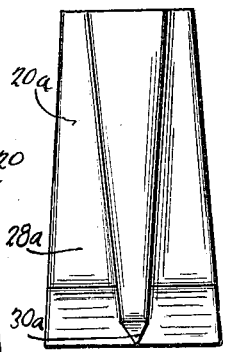

Patented Nov. 15, 1932

1,887,698

UNITED STATES PATENT OFFICE

JOHN ANTON PERUSICK, OF BUTTE, MONTANA

DRILL

Application filed May 26, 1932. Serial No. 613,723.

This invention relates to certain new and useful improvements in drills.

The primary object of the invention is to provide a drill for rock, or other earth boring operations wherein the drill head comprises jaw members slidably mounted upon the tapering shank or blade with the jaws constructed for accomplishing the drilling and casing of a wall with the jaws and shank or blade so designed that when the jaws are fully positioned on the shank or blade, the cutting edges thereof occupy a maximum diameter as compared with a shifted movement of the jaws upon the shank or blade during removal of the drill from a boring operation, with the peripheral cutting edges of the drill jaws spaced from the casing wall to permit easy removal of the drill, means being provided to prevent accidental escape of the jaws from the drill shank or bit.

A further object of the invention is to provide a drill of the foregoing character wherein drill shank is provided with a tapering blade upon which drill jaws are adjustably and slidably mounted with spring catches interposed between the tapering blade and jaws to limit sliding movement of the jaws outwardly of the blade with the spring device manually operated exteriorly of the drill blade and jaws to permit complete removal of the jaws for sharpening, repair or other purposes.

A further object of the invention is to provide a drill for use in all underground drilling operations (leyners, jackhammers and stopers) wherein a circular hole is to be drilled in any type of ground, concrete, filling, timber or gob, more especially for use in drilling holes into underground fire zones for any purpose, and to permit easy removal of the bit when stuck to the walls of the hole being drilled, the object being accomplished by pulling out on steel provided with lugs on the machine end of said steel, in which case slidably mounted jaws pull out into a releasing position allowing easy removal. When working with a steel without lugs, the object is accomplished by manually pulling out on the steel.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of a drill constructed in accordance with the present invention showing the tapering blade carried by the drill shank with a pair of jaws carried by the blade;

Figure 2 is a side elevational view, similar to Figure 1, showing the jaws slidably shifted outwardly of the blade with the cutting edges thereof moved toward each other to reduce the diameter of the drill;

Figure 3 is a side elevational view of the drill shank with the jaws removed, illustrating the tapered blade and spring catches carried thereby;

Figure 4 is another side elevational view of the drill with the jaws removed with the spring catches shown in elevation and further showing the longitudinal bore through the drill shank and blade for the feeding of water to the cutting edge of the drill;

Figure 5 is an end elevational view of the drill with the jaws in position with a double wing or double cutter carried by each jaw;

Figure 6 is an inner side elevational view of one of the jaws removed from the shank and illustrating the shouldered depression therein to take a spring device;

Figure 7 is a cross-sectional view taken on line 7—7 of Figure 1, showing the dove-tailed sliding connection between the drill shank blade and jaws;

Figure 8 is a fragmentary side elevational view, partly in section illustrating the spring device carried by the tapered blade of the drill shank extended into the shouldered recess of the jaw for limiting outward movement of the jaw relative to the drill shank;

Figure 9 is a side elevational view of another form of drill and jaws showing the tapered blade with a jaw on each side thereof, the latter carrying a single cutting wing or rib; and Figure 10 is an outer side elevational view of one of the jaws shown in Fig. 9.

Referring more in detail to the accompanying drawing and particularly Figures 1 to 8, there is illustrated a drill comprising a stub shank 15 for attachment to drilling apparatus in any appropriate manner and said stub shank 15 may be threaded if desired. The stub shank 15 forms a part of the head of the drill and further includes a body portion 16 of frusto-conical formation with the stub shank projecting from the smaller end thereof, the outer end of the frusto-conical body 16 having end shoulders 17 separated by an elongated, axially extending tapered blade 18 gradually increasing in width toward its outer end with opposite sides thereof aligned with adjacent side faces of the frusto-conical body 16 as shown in Figure 4. A dove-tailed rib 19 projects outwardly of each face of the tapering blade 18 and extends longitudinally and centrally thereof for cooperation with a removable jaw member.

A pair of jaws 20 is slidably mounted upon the tapering blade 18, each jaw 20 having an inclined inner flat face 21 shown in Figure 6 and having a central longitudinally extending dove-tailed groove 22 that is slidably received upon the adjacent blade rib 19. The inner face of each jaw adjacent the inner end thereof at one side of the groove 22 has a depressed portion 23 terminating in an abutment shoulder 24. Each face of the tapering blade 18 at one side of the rib 19 and approximately intermediate the ends of the blade is recessed as at 25 for the reception of a leaf spring 26 normally projecting therefrom and retained in the recess 25 by the pin 27 engaged with the outer end of the spring and passing through the blade 18 as shown in Figure 8.

The jaws 20 when in the position shown in Figure 1 form a continuation of the frusto-conical body portion 16, flaring outwardly toward the cutting end of the jaws. Each jaw is provided with a pair of outwardly directed wings or ribs 28 substantially in the form of a V with the apex thereof disposed toward the blade 18 and each wing 28 has a lower or bottom cutting edge 29 and an outer vertical cutting edge 30 that is employed for casing for the walls of the hole being drilled.

It is to be understood that the jaws may be of any shape desired as well as possess the desired number of cutting wings or ribs and as shown in Figures 9 and 10, each jaw 20a carries a centrally disposed outwardly projecting rib 28a provided upon its lower end with a beveled cutting edge 29a and a casing cutter 30a at the outer end of the cutting edge 29a that projects outwardly of the lower end of the rib 28a.

When the jaws are in cutting position on the head of the drill, they occupy the positions shown in Figures 1 and 9 with the inner ends thereof engaged with the abutment shoulders 17 at the outer end of the frusto-conical body portion 16. The cutting edges 29—30 and 29a—30a simultaneously perform a drilling operation as well as case the wall of the hole being drilled, downward pressure on the drill head maintaining the jaws in the positions shown in Figures 1 and 9, aided by frictional engagement between the jaws and tapered blade depending from the drill body. When it is desired to remove the drill from the hole being bored for the sharpening of the jaws or replacement thereof, upward movement of the drill body will cause the jaws 20 or 20a to be moved outwardly of the tapered blade 18 due to the presence of friction between the cutting edges of the jaw blades and the walls of the hole being bored with the jaws moving inwardly toward the tapered end of the blade 18 to occupy a position of lesser diameter as indicated by the dotted lines A and B in Figure 2 so that the drill is free to be removed from the hole being bored. Sliding movement of the jaws upon the tapered blade 18 is limited by the free ends of the leaf springs 26 moving into engagement with the abutment shoulder 24 of the depressions 23 in the jaws 20 and 20a as shown in Figure 8. The depressions 23 open at the outer sides of the jaws 20 and 20a to facilitate the placement of an implement therein for disengaging the spring 26 from the abutment jaw 24 to move the spring into the depressions 25 so that the jaw may be completely slidably removed from the tapered blade 18 of the drill body. The movement of the jaws from the full line positions shown in Figure 1 or from the dotted line positions shown in Figure 2 to the full line positions shown in Figure 2 is automatically accomplished upon initial withdrawal movement of the drill, such sliding movements of the jaws being limited by the leaf springs 26 moving into the depressions 23 for engagement with the abutment shoulder 24. The drill is provided with a longitudinally extending bore 15a through which water is flowed to the cutting edges of the jaws in the usual manner.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a drill, a stub shank and body portion, a tapered blade carried by the body portion, a longitudinally extending dove-tail rib on each side of the blade, a jaw having a dovetail groove received on each rib and blade face, a socket in each face of the blade, a leaf spring anchored at one end in the socket with its other end normally projecting therefrom and each jaw having a depression therein defining an abutment shoulder to be engaged by the projecting end of the leaf spring to prevent complete removal of the jaw from the drill blade.

2. In a drill, a stub shank and body portion, a tapered blade carried by the body portion, a longitudinally extending dove-tail rib on each side of the blade, a jaw having a dove-tail groove received on each rib and blade face, a socket in each face of the blade, a leaf spring anchored at one end in the socket with its other end normally projecting therefrom and each jaw having a depression therein defining an abutment shoulder to be engaged by the projecting end of the leaf spring to prevent complete removal of the jaw from the drill blade, and the depression opening outwardly of the jaw permitting access to the spring for removal from the jaw depression for complete removal of the jaw.

In testimony whereof I affix my signature.

JOHN ANTON PERUSICK.